United States Patent
Kumar et al.

(10) Patent No.: US 8,689,129 B1
(45) Date of Patent: Apr. 1, 2014

(54) METHOD AND APPARATUS FOR PROVIDING A DISPLAY INTERFACE UTILIZING A PLURALITY OF DISPLAY STATES

(75) Inventors: Kannan Ramesh Kumar, Union City, CA (US); Robert A. Morganstern, San Jose, CA (US); W. Richard Barker, Ivybridge (GB)

(73) Assignee: Symantec Operating Corporation, Mountain View, CA (US)

( * ) Notice: Subject to any disclaimer, the term of this patent is extended or adjusted under 35 U.S.C. 154(b) by 1856 days.

(21) Appl. No.: 10/951,184

(22) Filed: Sep. 27, 2004

(51) Int. Cl.
G06F 3/048 (2013.01)
G06F 17/00 (2006.01)

(52) U.S. Cl.
USPC .............. 715/777; 715/218; 715/243

(58) Field of Classification Search
USPC ......... 715/795, 796, 802, 212, 218, 221, 225, 715/243, 277, 777, 853–855
See application file for complete search history.

(56) References Cited

U.S. PATENT DOCUMENTS

| | | | |
|---|---|---|---|
| 5,317,686 A * | 5/1994 | Salas et al. ................... | 715/212 |
| 5,950,168 A * | 9/1999 | Simborg et al. ................ | 705/3 |
| 6,526,399 B1 * | 2/2003 | Coulson et al. ................ | 1/1 |
| 6,944,818 B2 * | 9/2005 | Newman et al. .............. | 715/517 |
| 2003/0227488 A1 * | 12/2003 | Arend et al. ................ | 345/795 |

OTHER PUBLICATIONS

"Microsoft Project for Windows—Feature Guide", Version 1.0, copyright 1990 Microsoft Corporation.*

* cited by examiner

*Primary Examiner* — Omar Abdul-Ali
*Assistant Examiner* — Andrew Tank
(74) *Attorney, Agent, or Firm* — Campbell Stephenson LLP

(57) ABSTRACT

A method and apparatus for displaying data. In one embodiment, the method displays a summary icon at an intersection of a row and a column in a first display state. The method similarly displays the summary icon and the data represented by the summary icon by expanding a display pane to accommodate the data in a second display state.

16 Claims, 8 Drawing Sheets

METHOD AND APPARATUS FOR PROVIDING A DISPLAY INTERFACE UTILIZING A PLURALITY OF DISPLAY STATES

CROSS-REFERENCE TO RELATED APPLICATIONS

This application contains subject matter that is related to U.S. patent application Ser. No. 10/951,138, filed Sep. 27, 2004, entitled METHOD AND APPARATUS FOR PROVIDING A DISPLAY INTERFACE UTILIZING TABLE HEADER SLIDERS, which is being filed simultaneously herewith. The aforementioned related patent application is incorporated herein by reference in its entirety.

BACKGROUND OF THE INVENTION

1. Field of the Invention

Embodiments of the present invention generally relate to computer displays, and more particularly, to a method and apparatus for providing a display interface utilizing a plurality of display states.

2. Description of the Related Art

Computer screen displays are commonly used to display a wide variety of data and images. At present, several software applications display data and images in a manner that exceeds the viewing area of the screen display. Specifically, the output produced by these applications involves a substantial amount of data that occupies more screen area than is available. Alternatively, the output is in the form of images requiring a certain level of resolution and detail, which cause the image to extend beyond the normal viewing area.

Consequently, problematic scenarios, such as those mentioned above, have led to the development of various solutions that allow the user to view data and images that extend beyond the limited viewing area. However, many of these solutions fail to completely solve this problem. As such, users are prevented from seeing all of the data and/or image on the screen display at once. For instance, one such solution entails the use of vertical and horizontal scrollbars. More specifically, a large image display that exceeds the dimensions of the computer screen may be viewed by adjusting sliding scroll bars to move the image on the screen display relative to a display window. Although this solution does enable the user to view all the parts of the image, the user cannot observe the entire image at one time. Thus, the user is limited to viewing sections of the image that are as large as the viewing area of the screen display. In addition, this method can prove to be inconvenient and extremely unwieldy to use when trying to view large images and amounts of data.

Another method that addresses the viewing limitations is the zoom-out feature. Several applications provide the user with a zoom-out button, allowing the user to zoom out and view as much of the image as needed. Alternatively, some applications provide the user with a "best-fit" option where the application automatically adjusts the size of the image allowing the user to view the image in its entirety without the inconvenience of scrollbars. However, reducing an image in this manner, or via the zoom-out feature, is likely to compromise the resolution of the image or cause data to shrink to an unreadable size. Hence, using the "best-fit" and zoom-out options could likely be seen as ineffective solutions for certain images and data displays.

Therefore, a need exists for an improved method and apparatus for displaying large amounts of data on a computer display screen.

SUMMARY OF THE INVENTION

The invention provides a method and apparatus for displaying data. The display generally comprises a two dimensional grid of graphical icons arranged into rows and columns. In one embodiment of the present invention, the method displays a summary icon at an intersection of a row and a column in a first display state. The summary icon graphically represents data that can be displayed using a second display state. The method selectively displays data represented by the summary icon by expanding a display pane proximate the summary icon to accommodate the data in a second display state. Consequently, a large amount of data can be summarized and depicted in the summary icon. When a user requires knowledge of the underlying data that was used to form the summary icon, selecting the summary icon expands the display proximate the icon to display the underlying data at the intersection of the row and column. Other summary icons remain displayed as summary icons. In further embodiments of the invention, the underlying data may comprise further icons that may be expanded.

BRIEF DESCRIPTION OF THE DRAWINGS

The following detailed description makes reference to the accompanying drawings which are now briefly described.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must).

Similarly, the words "include," "including," and "includes" mean including, but not limited to.

DETAILED DESCRIPTION

Figure 1:
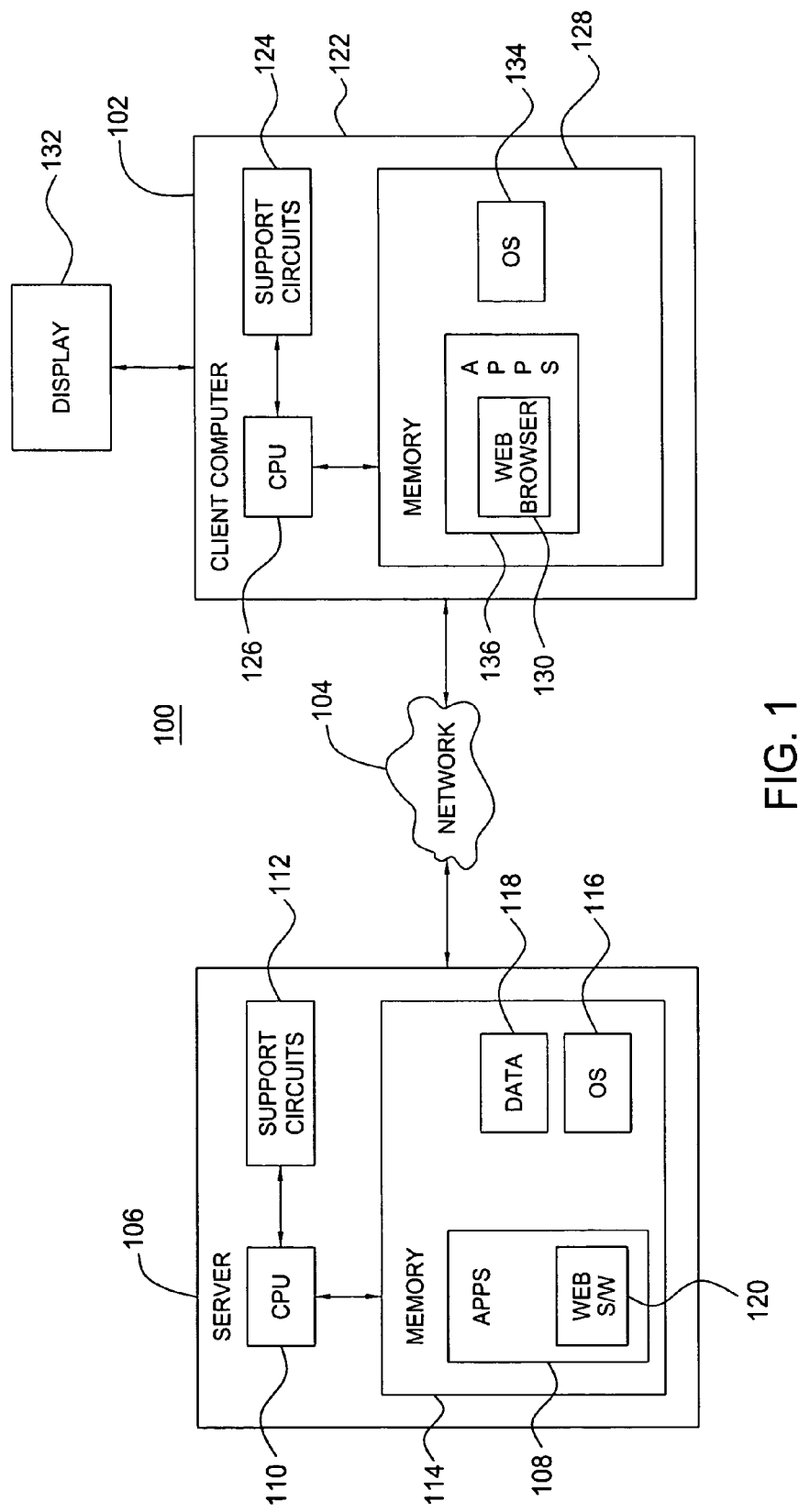
FIG. 1 depicts a block diagram of a computer network that operates in accordance with the present invention.

FIG. 1 depicts a computer network 100 in which the embodiments of the present invention may be utilized. This figure only portrays one variation of the myriad of possible network configurations. For example, FIG. 1 could have depicted numerous host servers 106 or several client computers 102. For simplicity and clarity, only one host server 106 and one client computer 102 are depicted. The invention, as shall be discussed below, is a method and apparatus for providing a display interface utilizing a plurality of display states.

The computer network 100 comprises of a client computer 102 that is connected to the host server 106 through a conventional data communications network 104 (e.g., the Internet, LAN, WAN, and the like). A host server 106 is coupled to the network 104 to supply application and data services as well as other resource services to the client computer 102. The client computer 102 is also coupled to a display 132.

The host server 106 comprises at least one central processing unit (CPU) 110, support circuits 112, and memory 114. The CPU 110 may comprise one or more conventionally available microprocessors. The support circuits 112 are well known circuits used to promote functionality of the CPU 110. Such circuits include but are not limited to a cache, power supplies, clock circuits, input/output (I/O) circuits and the like. The memory 114 is coupled to the CPU 110 and may comprise random access memory, read only memory, removable disk memory, flash memory, and various combinations of these types of memory. The memory 114 is sometimes referred to as main memory and may, in part, be used as cache memory or buffer memory. The memory 114 generally stores the operating system 116 of the server 106 and various forms of application software 108 and data 118. The operating system 116 may be one of a number of commercially available operating systems such as, but not limited to, SOLARIS from SUN Microsystems, Inc., AIX from IBM Inc., HP-UX from Hewlett Packard Corporation, LINUX from Red Hat Software, Windows 2000 from Microsoft Corporation, and the like. The application software 108 may include Web server software 120 that comprises of a variety of software programs responsible for accessing, storing, and/or maintaining "Web sites" and "Web pages." Generally, this software provides access to data and information that is stored on the server 106 via a "Web browser" that is executed on a remote computer (e.g., client computer 102).

The client computer 102 comprises a central processing unit (CPU) 126, support circuits 124, and memory 128. The client computer 102 is any form of computing device that can execute a browser and connect to the network 104. Such client computers include personal computers, a personal digital assistants (PDAs), wireless devices, or the like. The support circuits 124 are well known circuits used to promote functionality of the CPU 126. Such circuits include, but are not limited to, cache, power supplies, clock circuits, I/O interface circuits, and the like. The memory 128 may comprise one or more of random access memory, read only memory, flash memory, removable disk storage, and the like. The memory 128 may store various software packages, such as application software 136 and operating system software 134. The application software 136 may contain a variety of programs, including but not limited to a Web browser application 130. This Web browser 130 can be any software application that allows the user, among other things, to locate and display hypertext and Web pages from the World Wide Web or other form of network. Moreover, the Web browser 130 may be one of a number of commercially available browsers such as, but not limited to, NETSCAPE NAVIGATOR, MICROSOFT INTERNET EXPLORER, and the like. Similarly, the client computer 102 is connected to a display 132 with assistance of the support circuits 124 (i.e., I/O interface circuits). The display 132 is simply any screen type device (i.e., cathode ray tube (CRT), plasma display, liquid crystal display, and the like) that displays data or images.

Figure 2:
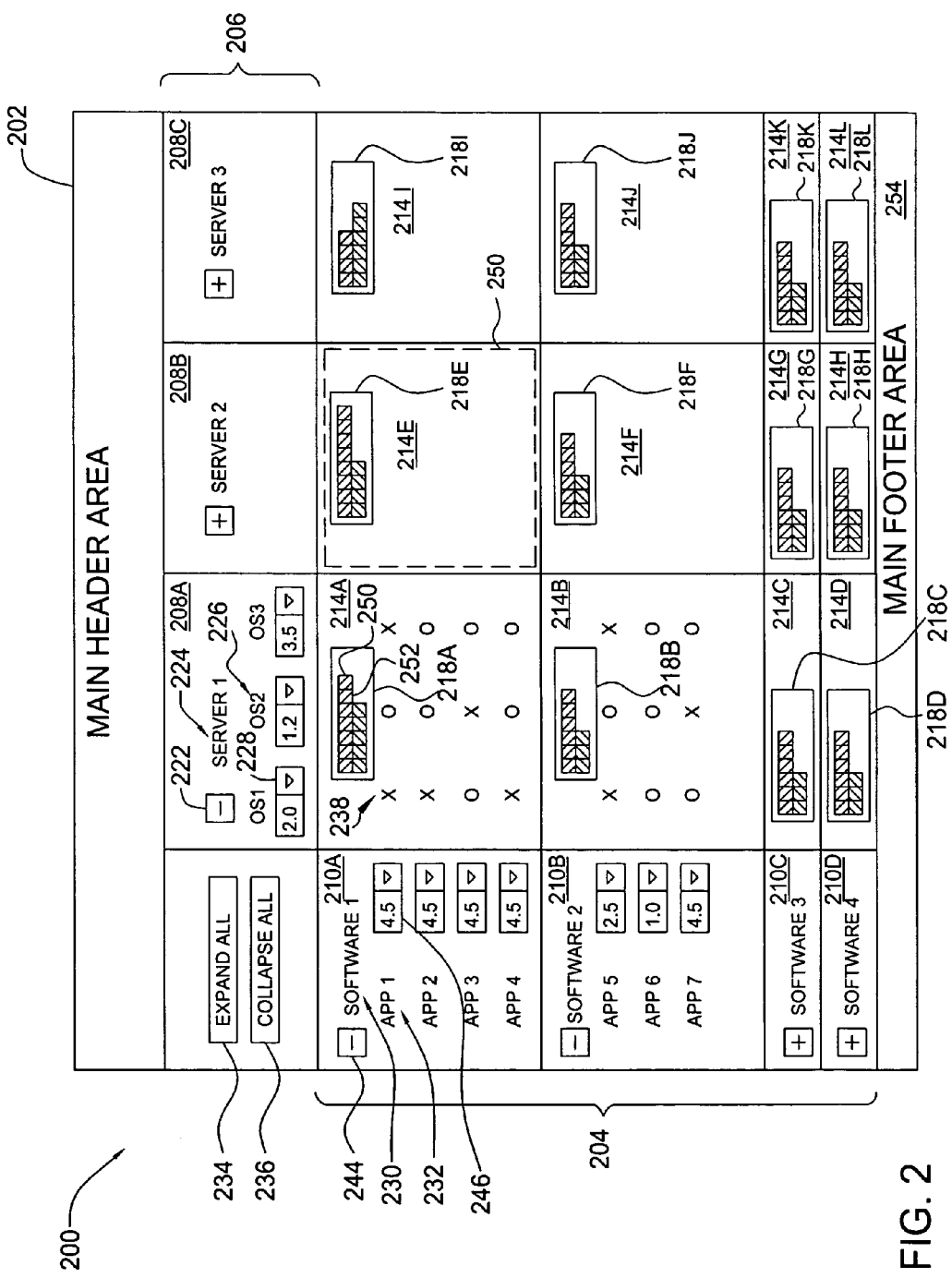
FIG. 2 depicts a block diagram of a display interface that operates in accordance with the present invention.

FIG. 2 depicts a display interface 200 that utilizes a plurality of display states. This display interface 200 is created using a combination of Hypertext Markup Language (HTML) <div> tags and JavaScript programming. In one exemplary embodiment, the interface 200 consists of a main header area 202, a main footer area 254, a vertical header column 204, a horizontal header banner 206, and a plurality of display panes 214A-214L that are arranged in a grid defined by rows and columns. The main header area 202 can be used for general display, such as exhibiting a particular display title or company name. The main footer area 254, which is typically located along the bottom of the screen, is similar to the main header area 202 and may be used in a similar manner. For the sake of simplicity, this description will frequently refer to a display pane 214, which is representative of the plurality of display panes 214A through 214L. Each display pane 214 defines a region where a summary icon 218 is positioned. The summary icon has an appearance that is representative of data that is not presently displayed. As shall be described below, selection of a summary icon 218 results in the expansion of the region around the summary icon to accommodate displaying the underlying data that is represented by the summary icon.

The horizontal header banner 206 is comprised of a plurality of horizontally aligned column header blocks 208A-C. For the sake of simplicity, this description will only refer to a column header block 208 which is representative of the plurality of column header blocks 208A through 208C. An expanded column header block 208A comprises a column header title 224, a column control button 222, and a plurality of column header elements 226 with corresponding pull-down lists 228. In one embodiment, the column header titles 224 contained in the column header blocks 208 lists several different types of servers. Accordingly, the column header elements 226 under each column header title 224 provides the names of a number of different operating systems that are able to be installed on the server specified by each respective column header element 226. Furthermore, the pull-down lists 228 can be utilized to select different version numbers of the listed operating systems.

Similarly, the vertical header column 204 is comprised of a plurality of vertically arranged row header blocks 210A-D. For the sake of simplicity, this description will only refer to a row header block 210 which is representative of the plurality of row header blocks 210A through 210D. A row header block 210 comprises a row header title 230, a row control button 244, and a plurality of row header elements 232 with corresponding pull-down lists 246. In one embodiment, the row header titles 230 contained in the row header blocks 210 detail several different types of software packages. Accordingly, the row header elements 232 under each row header title 230 provide the names of several different applications that are executed on the computer named by each respective row header element 232. For additional detail, the pull-down lists 246 can also be utilized to compare the version numbers of the listed software applications.

The display panes 214 are the sections of the interface 200 that contain the relevant data utilized by the user. A single display pane 214 is the area created by the intersection of the "column area" located beneath a column header block 208 and the "row area" extending to the right of a row header block 210 as depicted in FIG. 2. Although FIG. 2 depicts this particular orientation, it is important to realize that the row header blocks 210 (i.e., the entire vertical header column 204) can be positioned anywhere within the interface display 200 so long as the entire vertical header column extends from top to bottom (e.g. in the middle of the interface, to the far right of the interface, etc.). Similarly, the column header blocks 208 (i.e., the entire horizontal header banner 206) can be horizontally positioned anywhere within the interface display 200 so long as the entire horizontal header banner extends from the left to the right of the screen (e.g., in the middle of the interface, at the bottom of the interface, etc.).

Different types of information can be viewed with this interface 200 depending on whether the display pane 214 is in a detailed mode or an overview mode. Each display pane 214 can be selectively switched from the overview mode (a first display state) to the detail mode (a second display state) or vice versa. If the display pane 214 is in detailed mode, then the display pane 214A is expanded to reveal an array of notational indicators 238 or other data. As an option, the summary icon 218A may also be positioned at the top center of the display pane 214 when expanded as depicted in FIG. 2. Alternatively, the summary icon may be hidden upon expansion of the pane.

FIG. 2 also depicts the notational indicators 238 that are arranged in row and columns in the expanded display pane 214A. Closer inspection of the display pane 214A reveals that each notational indicator 238 is positioned at the intersection of a column header element 226 and a row header element 232. Referring to FIG. 2, an "X" notational indicator 238 (i.e., with the actual component label 238) is positioned at the intersection of the "column" having the column header element 226 labeled "OS1" and the "row" having the row header element 232 labeled "App1." According to the legend 242, this particular "X" notational indictor 238 signifies that "Application 1, version 4.5" of "Software package 1" is not supported by "Operating System 1, version 2.0" running on "Server 1." Likewise, the "O" indicator to the immediate right of this "X" notational indicator signifies that "Application 1, version 4.5" of "Software package 1" is supported by "Operating System 2, version 1.2" running on "Server 1." Again, it is important to note that the present invention is not limited to displaying software/server compatibilities, but rather, this example exhibited in FIG. 2 is just one of many applications that can be utilized with this display interface 200. More specifically, the present invention can be configured to display any type of information required by the user.

As mentioned previously, the summary icon 218 may be positioned at the top center of the expanded display pane 214A. The summary icon 218 can be embodied in several forms, such as a bar graph, a numerical counter, a symbolic indicator, and the like. In the exemplary embodiment shown in FIG. 2, the summary icon 218A is realized as a bar graph. The bar graph is comprised of two bars, where each bar 250 is comprised of numerous "bar units" 252. Each bar unit 252 represents a notational indicator 238 contained in the display pane 214. In FIG. 2, the two bars in the summary icon 218 respectively represent the overall number of software applications supported and not supported by the operating systems capable of being run by a particular server (i.e., indicated by the column block title).

In the event that the display pane 214 is collapsed to the overview mode, (e.g., the display pane 214C is in overview mode in FIG. 2), the individual notational indicators 238 will be concealed, but the summary icon 218C will be displayed within the collapsed display pane 214C. More specifically, in this software/server example, the overview mode affords the user the ability to quickly assess the product compatibility without having to examine the myriad of compatibility combinations provided by the detailed mode.

Moreover, the present invention allows for the convenient access of both the overview mode and the detailed mode of a particular display pane 214. This is accomplished by selecting (clicking) on a selection region 250, which outlines the border of a display pane 214. Although only one selection region is depicted in FIG. 2, it is important to realize that every display pane 214 has its own similar selection region 250. By clicking on the selection region 250, the display pane 214 is able to toggle from the overview mode to the detailed mode, and vice versa.

The display interface 200 includes two utility buttons for the convenience of the user. The first button is an "expand all" button 234 that causes all of the display panes 214 to open when it is selected. Likewise, a "collapse all" button 236 has been incorporated into the display interface which has the ability to close all the display panes when this button 236 is clicked.

Lastly, the display interface 214 employs the use of tree control buttons 222, 244 to manipulate the viewing area of the display. Namely, a column header tree control button 222 is used to expand and collapse the entire column corresponding to the column header tree control 222. Furthermore, by clicking on the column header tree control button 222, the column will alternate from an expanded mode to a collapsed mode, and vice versa. Likewise, the rows of the display interface 200 can be controlled in a similar manner by using the row header tree control button 244.

As mentioned above, the functionality of the display interface 200 was implemented using a combination of Hypertext Markup Language (HTML) <div> tags and JavaScript programming. More specifically, the display interface 200 is divided into sections which are formed by separate HTML <div> tags. Furthermore, these <div> tags may be nested so that one <div> tag contains multiple <div> tags. For example, the vertical header column 204 is made up of an HTML <div> tag. Similarly, each of the row header blocks 214A-D shown in FIG. 2 are made up of an HTML <div> tag. However, these four <div> tags are nested within the sole <div> tag associated with the vertical header column 204. JavaScript programming is used to manage the collapsing and opening of the display panes 214, column header blocks 208, and row header bocks 214. Specifically, JavaScript enables the repositioning (i.e., expanding or collapsing) of the header blocks, display panes 214, and the like by adjusting the properties of the <div> tags associated with these "areas" of the display interface 200. For example, the display pane's height, specified in the corresponding <div> tag's properties, may be changed to a low value (e.g., zero) if the display pane 214 is to be collapsed.

Figure 3:
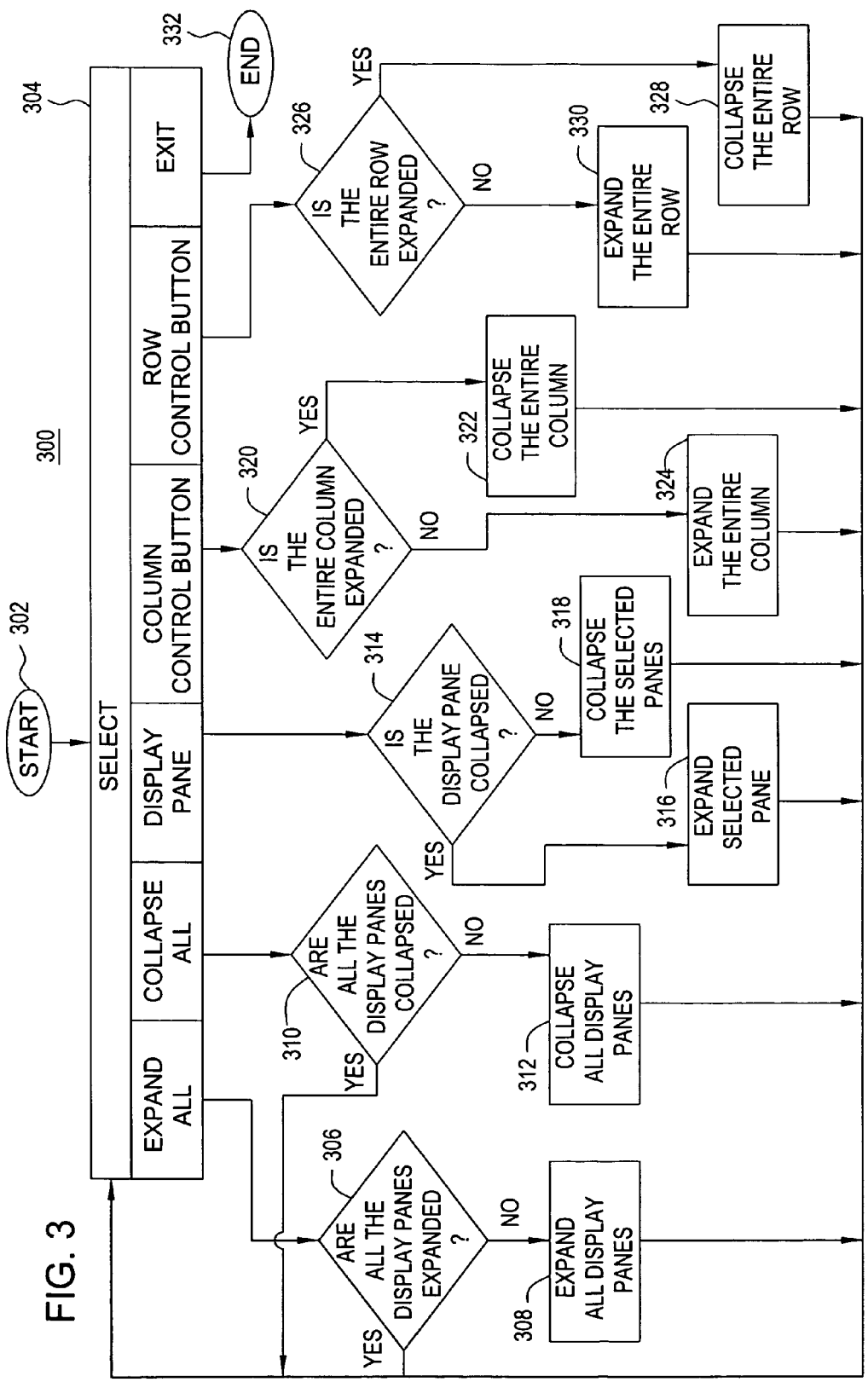
FIG. 3 depicts a flow diagram of a method for providing a display interface utilizing a plurality of display states.
Figure 4:
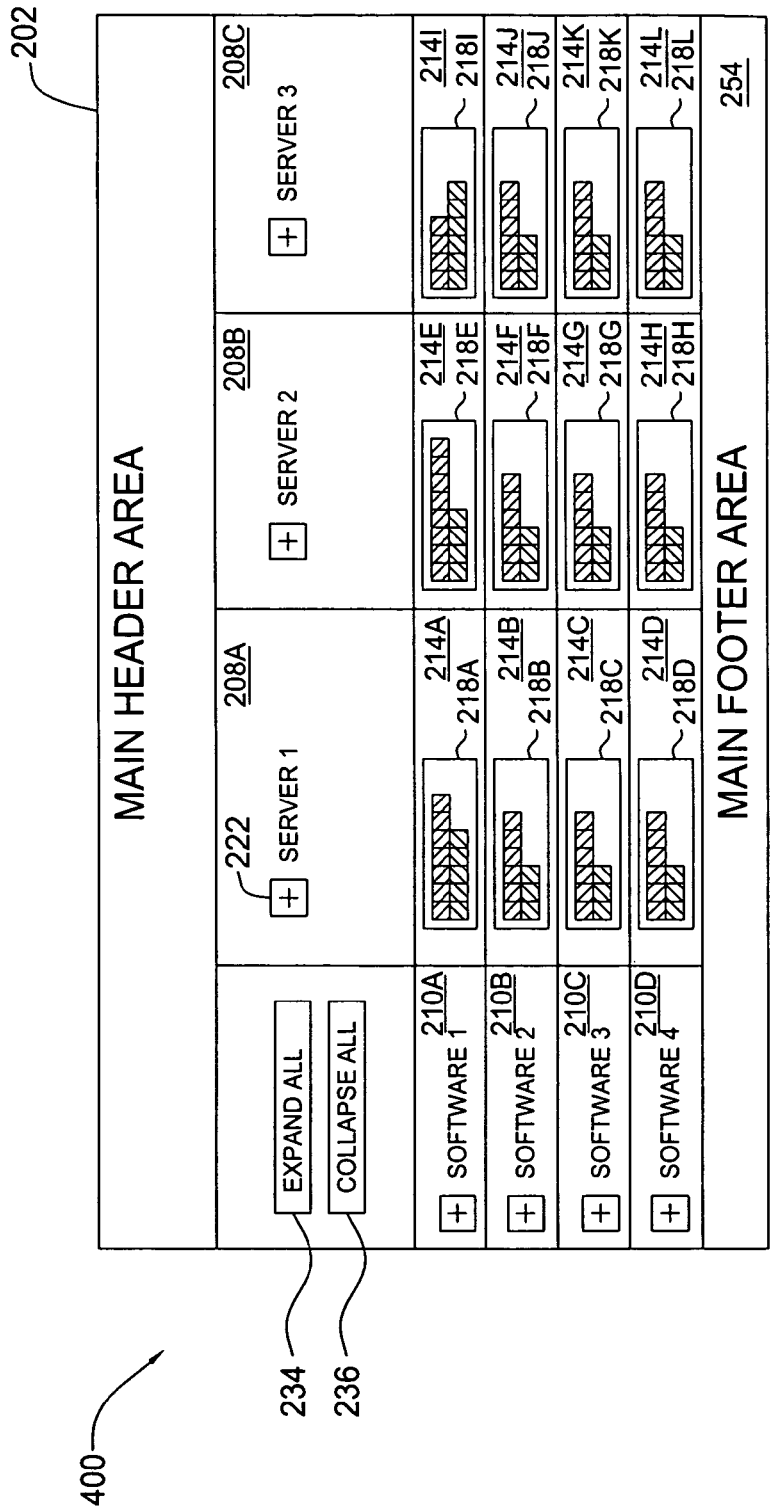
FIG. 4 depicts a block diagram of the display interface, where all of the display panes are collapsed to conceal their respective notational indicators.

FIG. 3 depicts an exemplary method 300 for displaying data utilizing the present invention. The method 300 starts at step 302 and proceeds to step 304 where an option for manipulating the display interface 200 is selected (i.e., one of the various control buttons or regions discussed above are selected). The options presented at step 304 include expanding all the display panes 214, collapsing all the display panes 214, selecting the selection region 250 of a display pane 214, selecting a column header tree control 222, selecting a row header tree control 244, and an exit alternative. For the purposes of this discussion, it is assumed that the display begins by having all the panes in a collapsed mode (see display 400 in FIG. 4).

Figure 5:
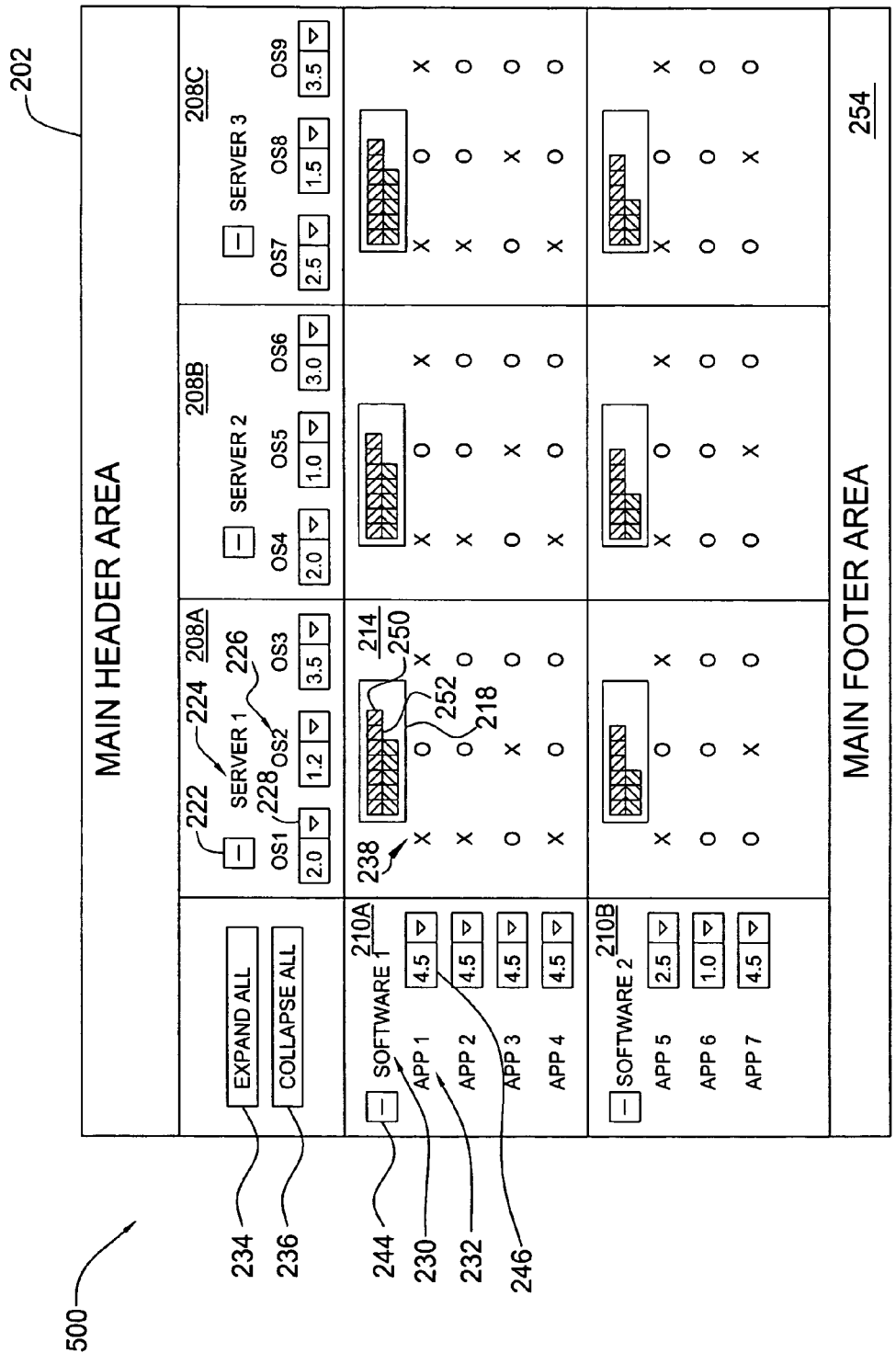
FIG. 5 depicts a block diagram of the display interface, where all of the display panes are expanded to reveal their respective notational indicators.

If a decision to expand all of the display panes is made at step 304 by selecting the Expand All button 234, the method 300 proceeds to step 306. At step 306, a determination is made as to whether or not all of the display panes 214 are expanded. If all of the display panes 214 are already in detailed mode, the method 300 returns to step 304 until another selection is made. If all of the display panes 214 are not expanded, then the method continues to step 308. At step 308, all of the display panes 214 are expanded to reveal their respective notational indicators 238 (see display 500 in FIG. 5). The method 300 returns to step 304.

If a decision is made to collapse all the display panes 214 at step 304 by selecting the Collapse All button 236, the method 300 proceeds to step 310. At step 310, a determination is made as to whether or not all of the display panes are currently collapsed. If all of the display panes 214 are already in overview mode, the method 300 returns to step 304 until another selection is made. If all of the display panes 214 are not collapsed, then the method continues to step 312. At step 312, all of the display panes 214 are collapsed to conceal their respective notational indicators 238 (see display 400 in FIG. 4). The method 300 returns to step 304.

Figure 6:
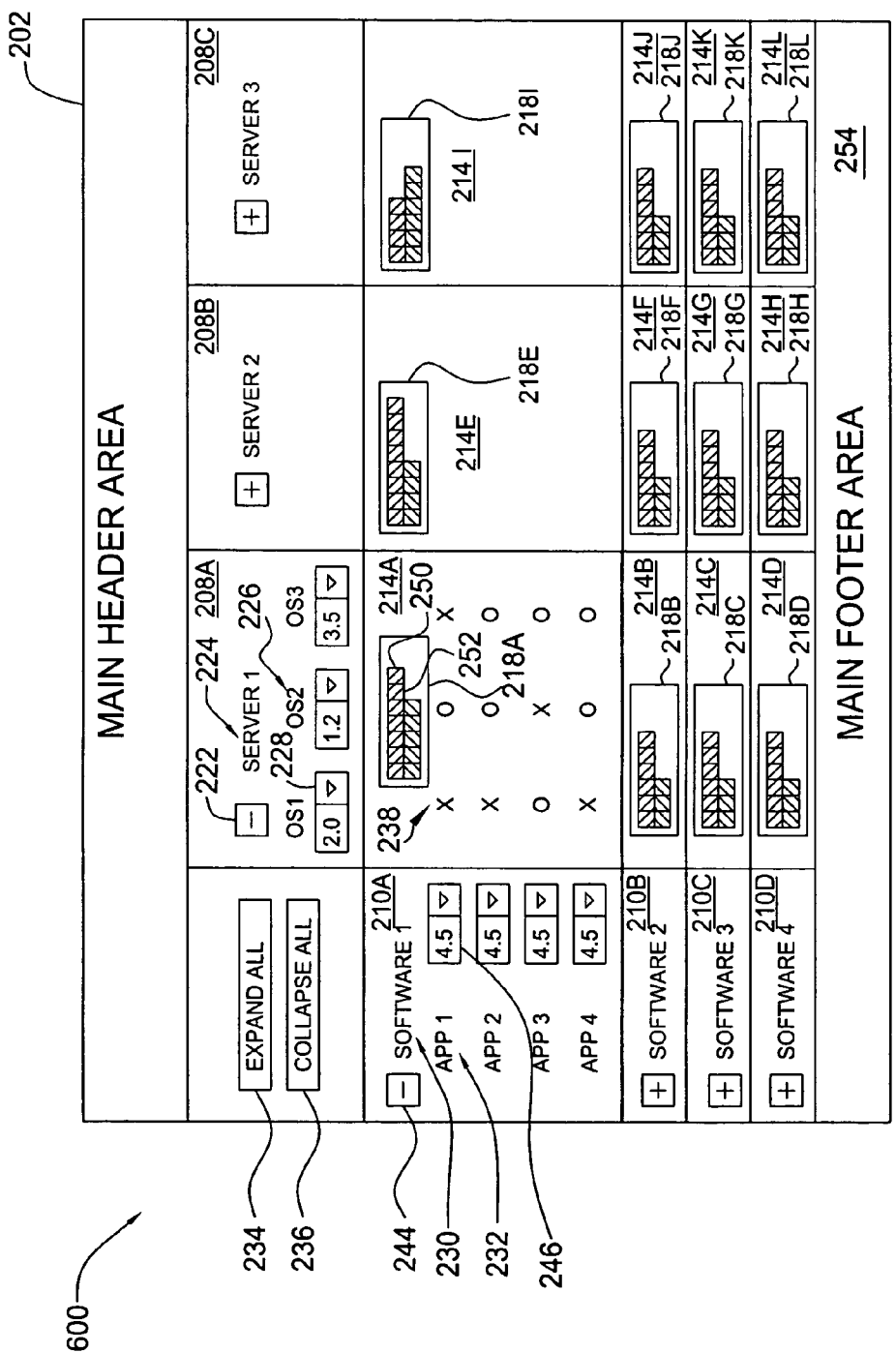
FIG. 6 depicts a block diagram of the display interface, where the expanded display pane reveals any notational indicators previously concealed.

Alternatively, if a user chooses to control a single display pane 214 at step 304 by selecting the summary icon 218, the method 300 continues to step 314. At step 314, a determination is made as to whether or not the chosen display pane 214 is currently collapsed. If the display pane 214 is already collapsed, then the method 300 proceeds to step 316 where the selected display pane 214 expands into detailed mode. As a result, the expanded display pane 214 reveals any notational indicators 238 previously concealed (see display 600, display pane 214A, in FIG. 6). The method 300 then returns to step 304.

However, if it is determined at step 314 that the chosen display pane 214 is in detailed mode and is presently expanded, then the method 300 continues to step 318 and causes the display pane 214 to collapse. As a result, the collapsed display pane 214 conceals any notational indicators 238 and only displays the summary icon 218 in this overview mode (see display 400, display pane 214A, in FIG. 4). The method 300 then returns to step 304.

Figure 7:
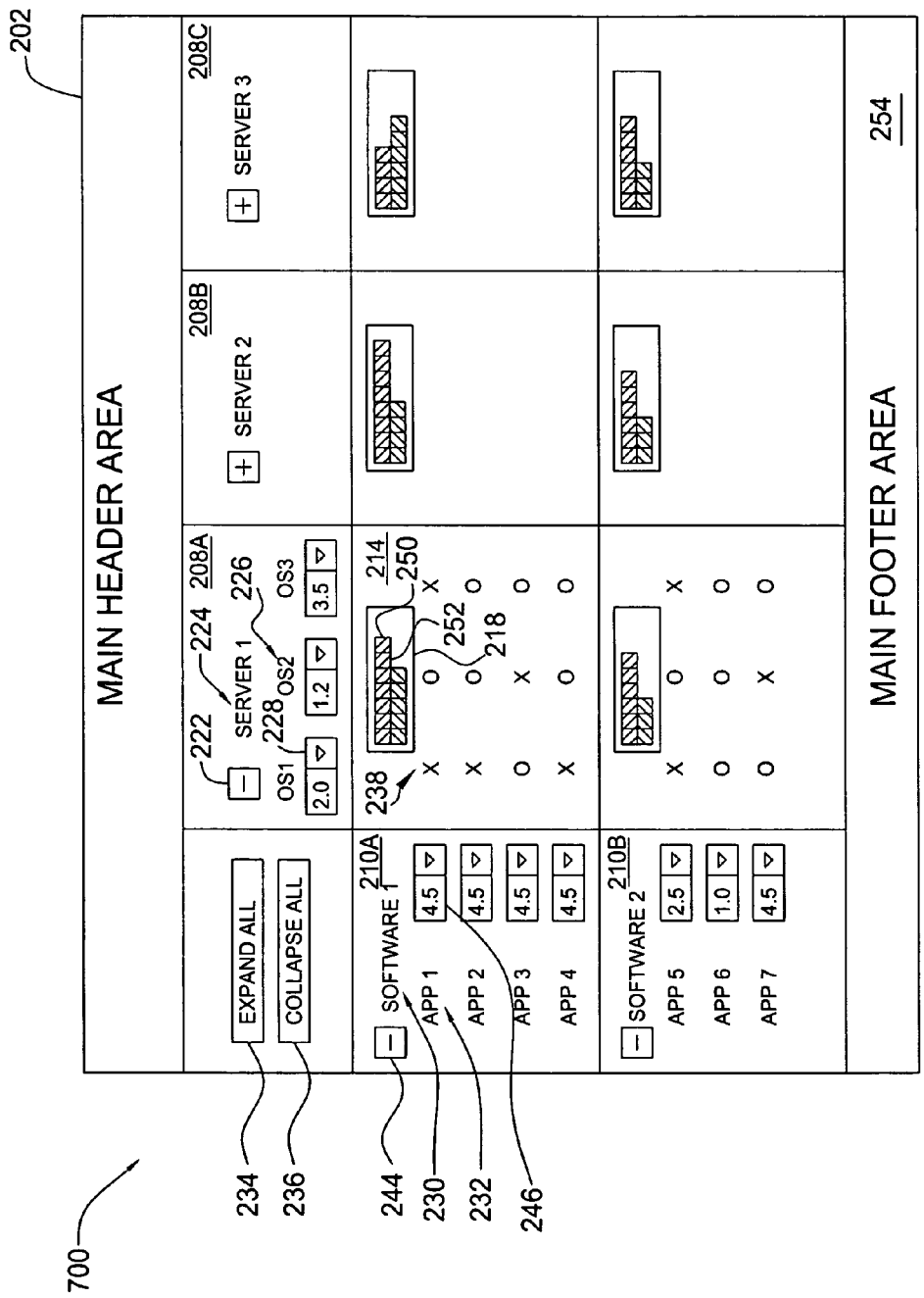
FIG. 7 depicts a block diagram of the display interface, where the entire column will be expanded along its horizontal dimension after the user selects the column control button.

At step 304, a user may decide to control a column of the display interface 200. By utilizing a column control button 222, the entire column corresponding to the particular column control button 222 can be readily manipulated. After the user selects the column control button 222, the method 300 continues to step 320 to determine if the entire column is currently expanded horizontally. If the column is already expanded in the horizontal direction, then the entire column will collapse along its horizontal dimension once the user selects the appropriate column control button 222. The method 300 then returns to step 304. Conversely, if it is determined that the entire column is not currently expanded, then the entire column will be expanded along its horizontal dimension after the user selects the aforementioned control button 222 (see display 700 in FIG. 7). The method 300 then returns to step 304.

Figure 8:
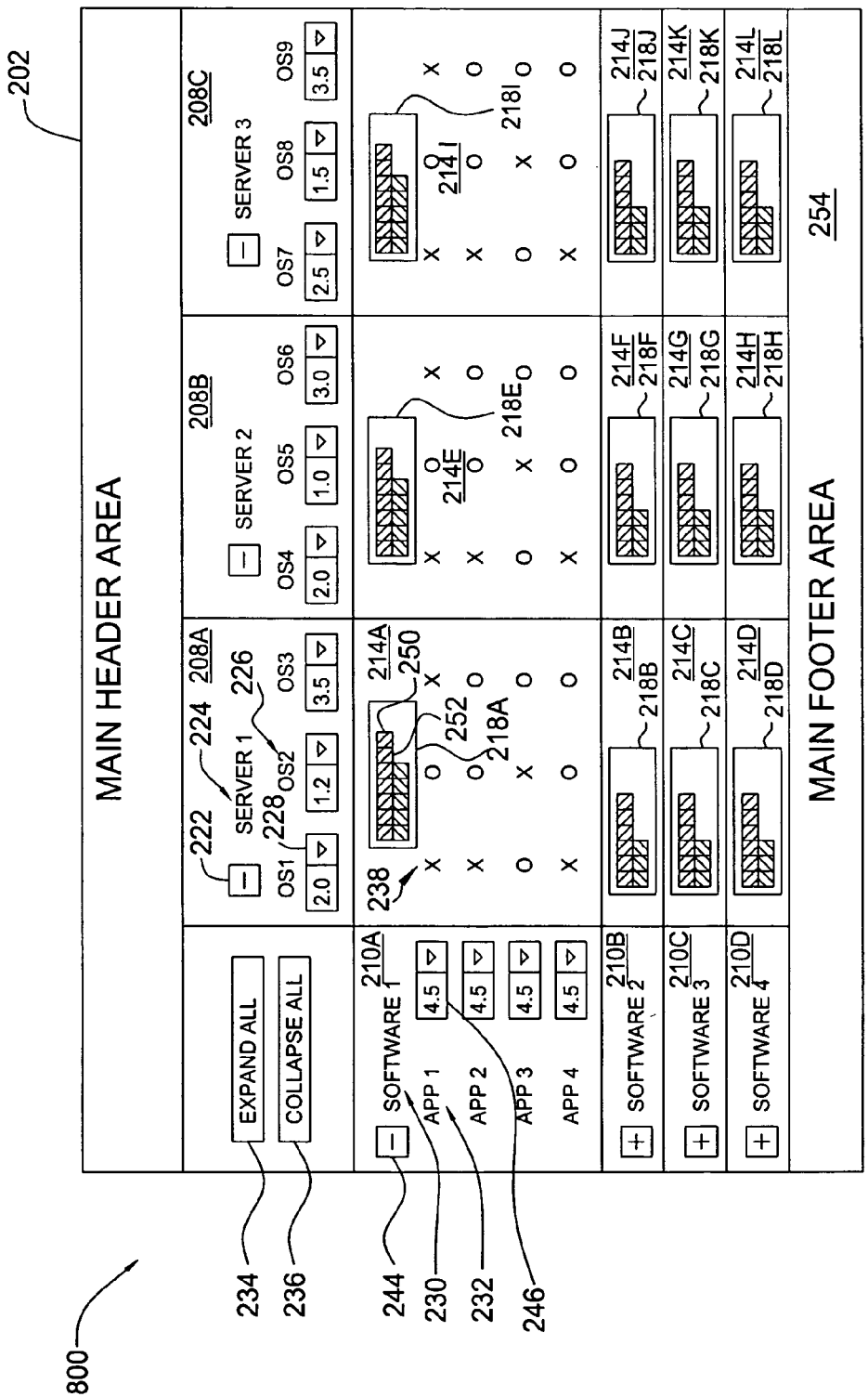
FIG. 8 depicts a block diagram of the display interface, where the entire row will expand vertically after the row control button is selected.

Similarly, if a user decides to control a row of the display interface 200 is made at step 304, the method 300 will proceed to step 326. At step 326, a determination is made as to whether or not the row chosen by the user is presently expanded. If the entire row is not currently expanded in the vertical direction, then the row will expand vertically after the row control button 244 is selected (see display 800 in FIG. 8). The method 300 then returns to step 304. Alternatively, if the row is currently expanded in the vertical direction, then the entire row will collapse along its vertical dimension after the row control button 244 is selected. The method 300 then returns to step 304.

If the user has no desire to manipulate the display interface 200 at step 304, a choice to exit the method 300 is made. The method 300 then proceeds to step 332 and ends.

In another embodiment of the present invention, the display interface 200 may include additional nested column header blocks 208 and additional nested row header blocks 210. More specifically, a column header element 226 or a row header element 232 may possess sub-elements which can be uncovered by "drilling down" to a lower nested tier by selecting the desired header element or a corresponding tree control button (not shown). These sub-elements would typically be more specific sub-components of the respective header elements 226, 232. Moreover, these nested levels would be displayed and manipulated in the same fashion as the column and row header blocks 208, 210 described above.

Similarly, the notational indicators may also afford the user nested levels of detail. For instance, by selecting a notational indicator (which may or may not posses its own unique selection region), a sub-display pane would open within the "original" display pane. This sub-display pane would exhibit more detailed information that may or may not correspond directly with the row and column sub-elements as described above. Moreover, these nested notation indicators 238 may be controlled in the same manner as the display panes 214 described above.

The present invention provides a display interface which can be used as a unique tool to display data in a summary form. In addition, the display interface can be manipulated to expand specific portions of interest, thus efficiently using the limited amount of available display space.

While the foregoing is directed to embodiments of the present invention, other and further embodiments of the invention may be devised without departing from the basic scope thereof, and the scope thereof is determined by the claims that follow.

What is claimed is:

1. A method comprising:
   assigning first data to a first display pane in a plurality of display panes arranged in a grid defined by rows and columns;
   assigning second data to second display pane in the plurality of display panes arranged in the grid, the first and second data are not equal to each other;
   configuring said first display pane to a first display state, said first display state concealing said first data and displaying a first summary icon in said first display pane representative of said first data;
   configuring said second display pane to a first display state, said first display state concealing said second data and displaying a second summary icon in said second display pane representative of said second data, wherein the first and second summary icons are different;
   determining that a selection of said first display pane in said first display state has occurred; and
   expanding said first display pane to a second display state in response to said selection of said first display pane, wherein said first display pane in said second display state displays an array of notational characters that represent the first data, wherein notational characters in a first row of the array indicate whether a first software application is supportable by respective operating systems, and notational characters in a second row of the array indicate whether a second software application is supportable by the respective operating systems.

2. The method of claim 1, wherein said determining comprises selecting a selection region of said first display pane in said first display state.

3. The method of claim 1, further comprising:
determining that another selection of said first display pane in said second display state has occurred;
collapsing said first display pane to said first display state.

4. The method of claim 1, wherein said first summary icon is displayed in said second display state.

5. The method of claim 1, wherein said first display pane is at an intersection of a plurality of column header elements and a plurality of row header elements, wherein the column header elements identify the operating systems, respectively, and wherein the row header elements identify the first and second software applications, respectively.

6. The method of claim 5, wherein said plurality of column header elements are horizontally aligned in a column header block positioned in said columns and said plurality of row header elements are vertically aligned in a row header block positioned in said rows.

7. An apparatus, comprising:
means for assigning first and second data to first and second display panes in a plurality of display panes arranged in a grid defined by rows and columns, wherein the first and second data are not equal to each other;
means for configuring said first and second display panes to a first display state, said first display state of the first pane concealing said first data and displaying a first summary icon in said first display pane representative of said first data, and said first display state of the second pane concealing said second data and displaying a second summary icon in said second display pane representative of said second data, wherein the first and second summary icons are different;
means for determining that a selection of said first display pane in said first display state has occurred; and
means for expanding said first display pane to a second display state in response to said selection of said first display pane, said second display state displaying said first data by expanding said first display pane to fit said data;
wherein said first display pane in said second display state displays an array of notational characters that represent the first data, wherein notational characters in a first row of the array indicate whether a first software application is supportable by respective operating systems, and notational characters in a second row of the array indicate whether a second software application is supportable by the respective operating systems.

8. The apparatus of claim 7, wherein said means for determining comprises means for selecting a selection region of said first display pane in said first display state.

9. The apparatus of claim 7, further comprising:
means for determining that another selection of said first display pane in said second display state has occurred;
means for collapsing said display first pane to said first display state.

10. The apparatus of claim 7, wherein said first summary icon is displayed in said second display state.

11. The apparatus of claim 7, wherein said first display pane is at an intersection of a plurality of column header elements and a plurality of row header elements, wherein the column header elements identify the operating systems, respectively, and wherein the row header elements identify the first and second software applications, respectively.

12. The apparatus of claim 11, wherein said plurality of column header elements are horizontally aligned in a column header block positioned in said columns and said plurality of row header elements are vertically aligned in a row header block positioned in said rows.

13. A method comprising:
assigning first and second data to first and second display panes in a plurality of display panes arranged in a grid defined on a screen by a plurality of column header blocks and a plurality of row header blocks, wherein the first and second data are not equal to each other;
configuring said first and second display panes to a first display state, said first display state of the first pane concealing said first data and displaying a first summary icon in said first display pane representative of said first data, and said first display state of the second pane concealing said second data and displaying a second summary icon in said second display pane representative of said second data, wherein the first and second summary icons are different;
expanding a column header block by selecting a first tree control button, wherein said column header block is horizontally aligned with said plurality of column header blocks on said screen;
expanding a row header block by selecting a second tree control button, wherein said row header block is vertically aligned with said plurality of row header blocks on said screen; and
expanding said first display pane to a second display state in response to said expanded row header block and said expended column header block, said second display state displaying said first data, wherein said first display pane in said second display state displays an array of notational characters that represent the first data, wherein notational characters in a first row of the array indicate whether a first software application is supportable by respective operating systems, and notational characters in a second row of the array indicate whether a second software application is supportable by the respective operating systems.

14. The method of claim 13, further comprising:
collapsing said first display pane from said second display state to said first display state.

15. The method of claim 14, wherein said collapsed first display pane is formed by the intersection of one of said plurality of row header blocks and one of said plurality of column header blocks, wherein said one of said plurality of row header blocks and one of said plurality of column header blocks are not expanded.

16. The method of claim 13, wherein said first summary icon is displayed in said display pane.

* * * * *